Aug. 4, 1953         C. E. ORR         2,647,775
MEANS FOR LOCKING REELS ON ARBORS
Filed Sept. 4, 1948                    7 Sheets-Sheet 1
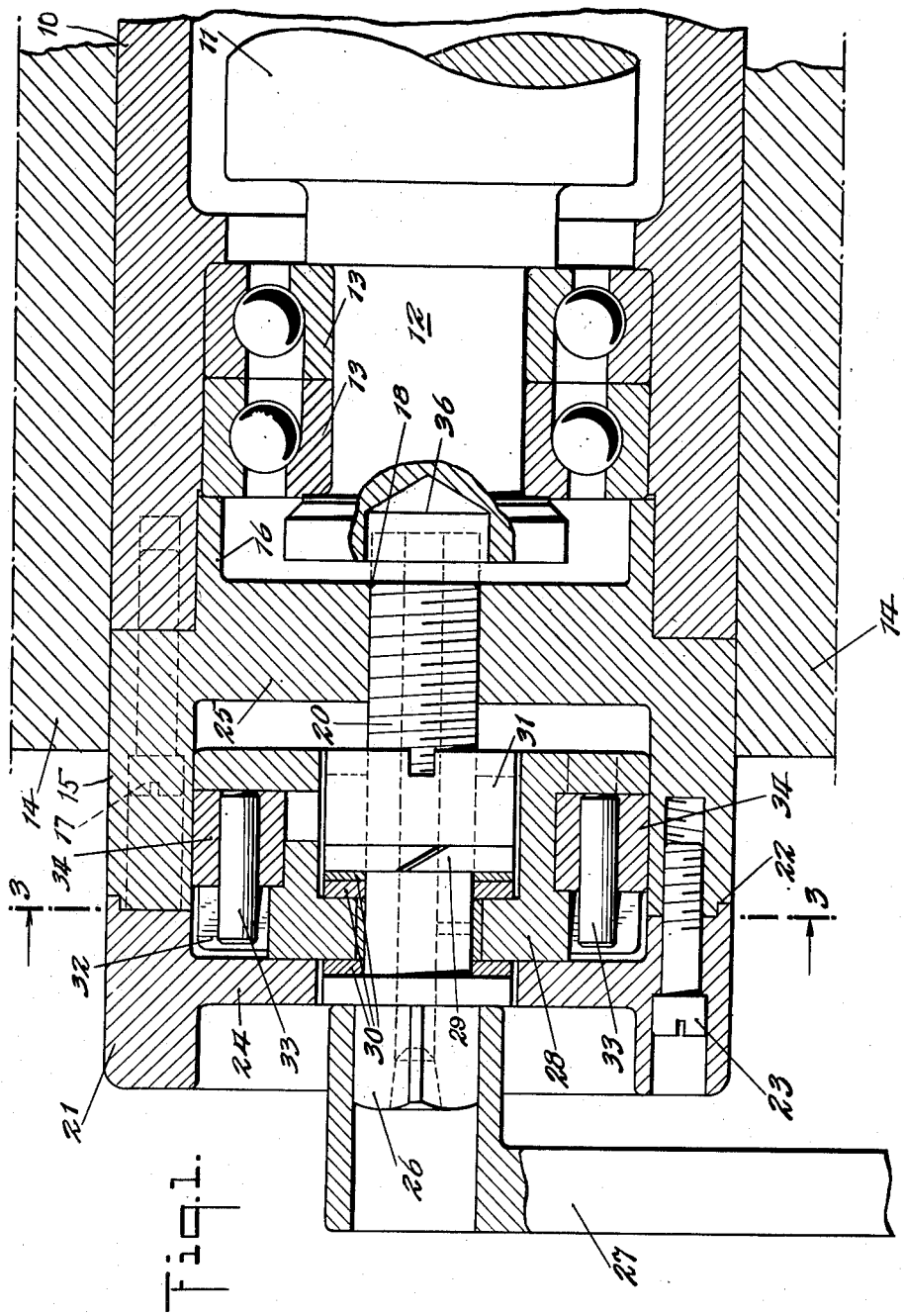
INVENTOR.
Carroll E. Orr
BY Darby & Darby
ATTORNEYS

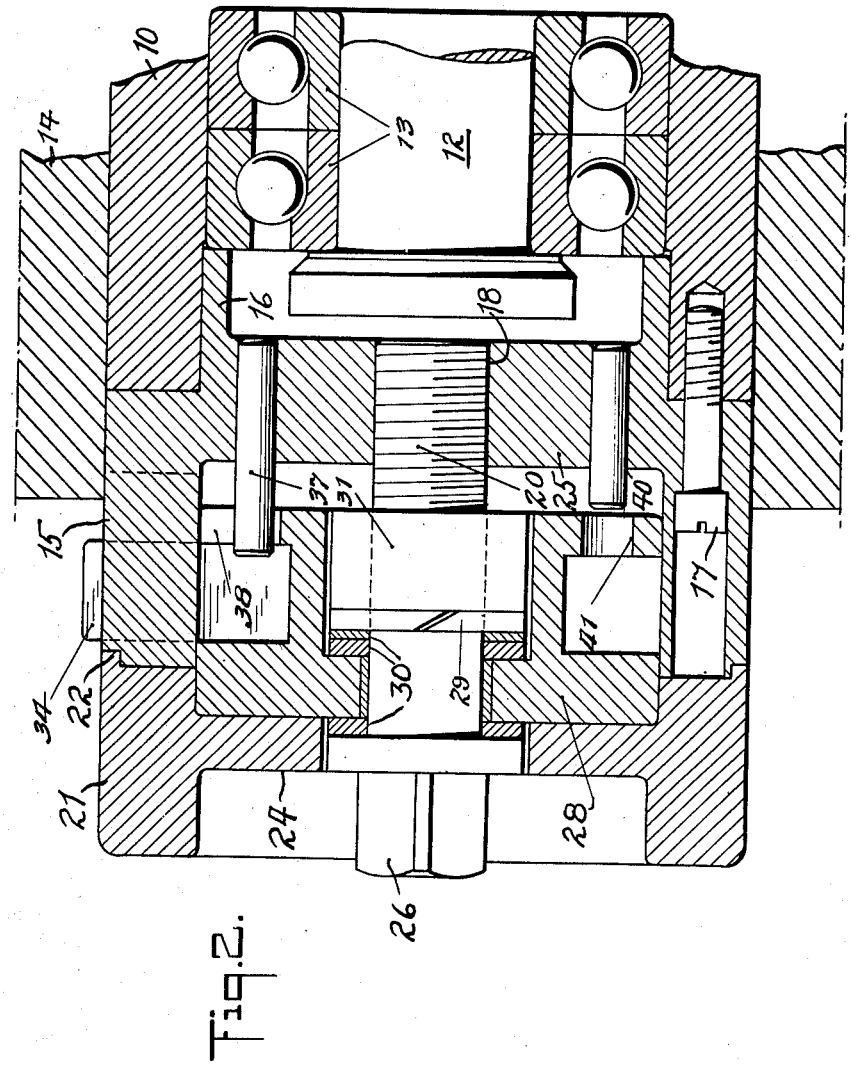

Aug. 4, 1953  C. E. ORR  2,647,775
MEANS FOR LOCKING REELS ON ARBORS
Filed Sept. 4, 1948.  7 Sheets-Sheet 3
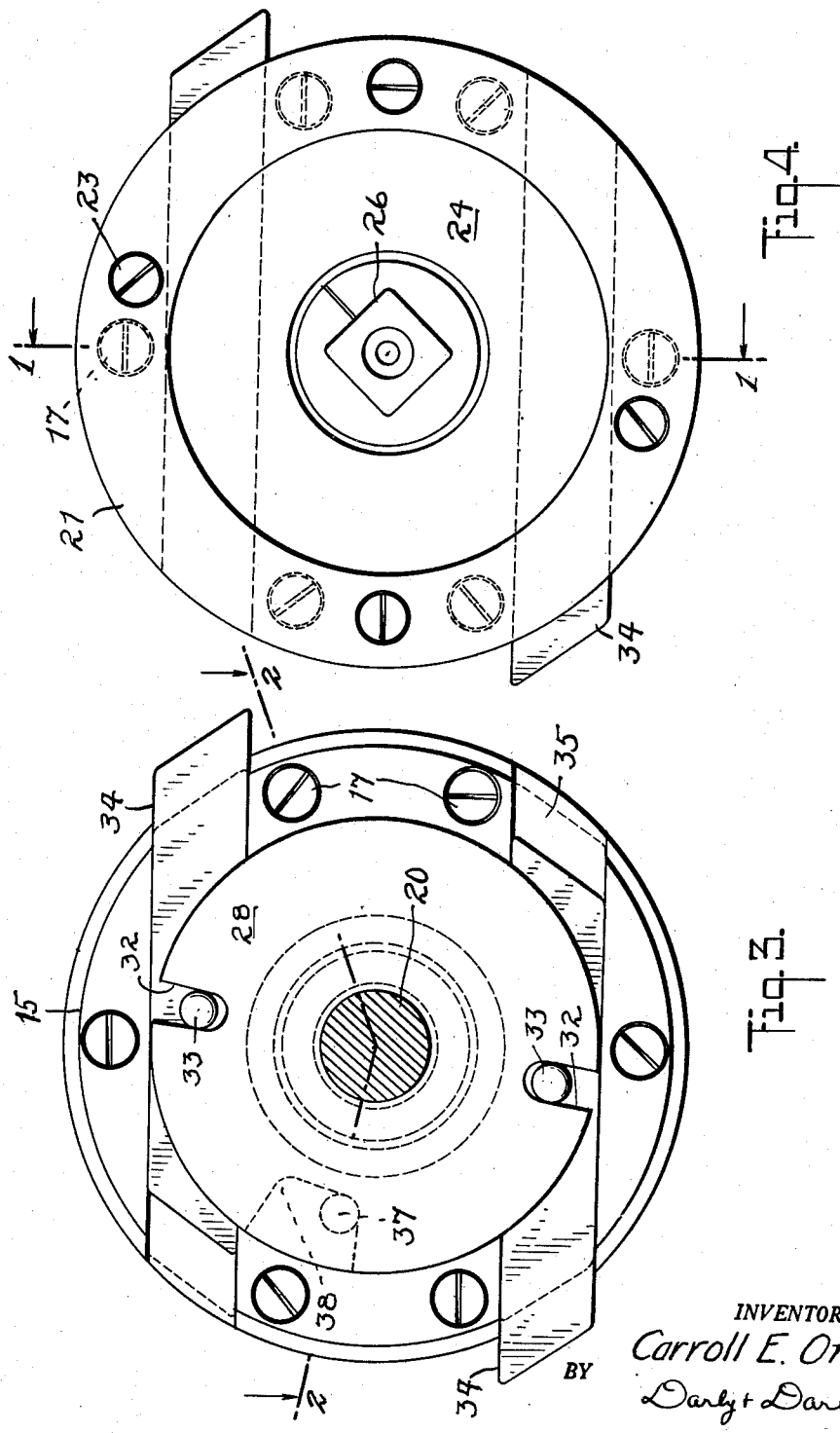
INVENTOR.
Carroll E. Orr
BY Darby & Darby
ATTORNEYS

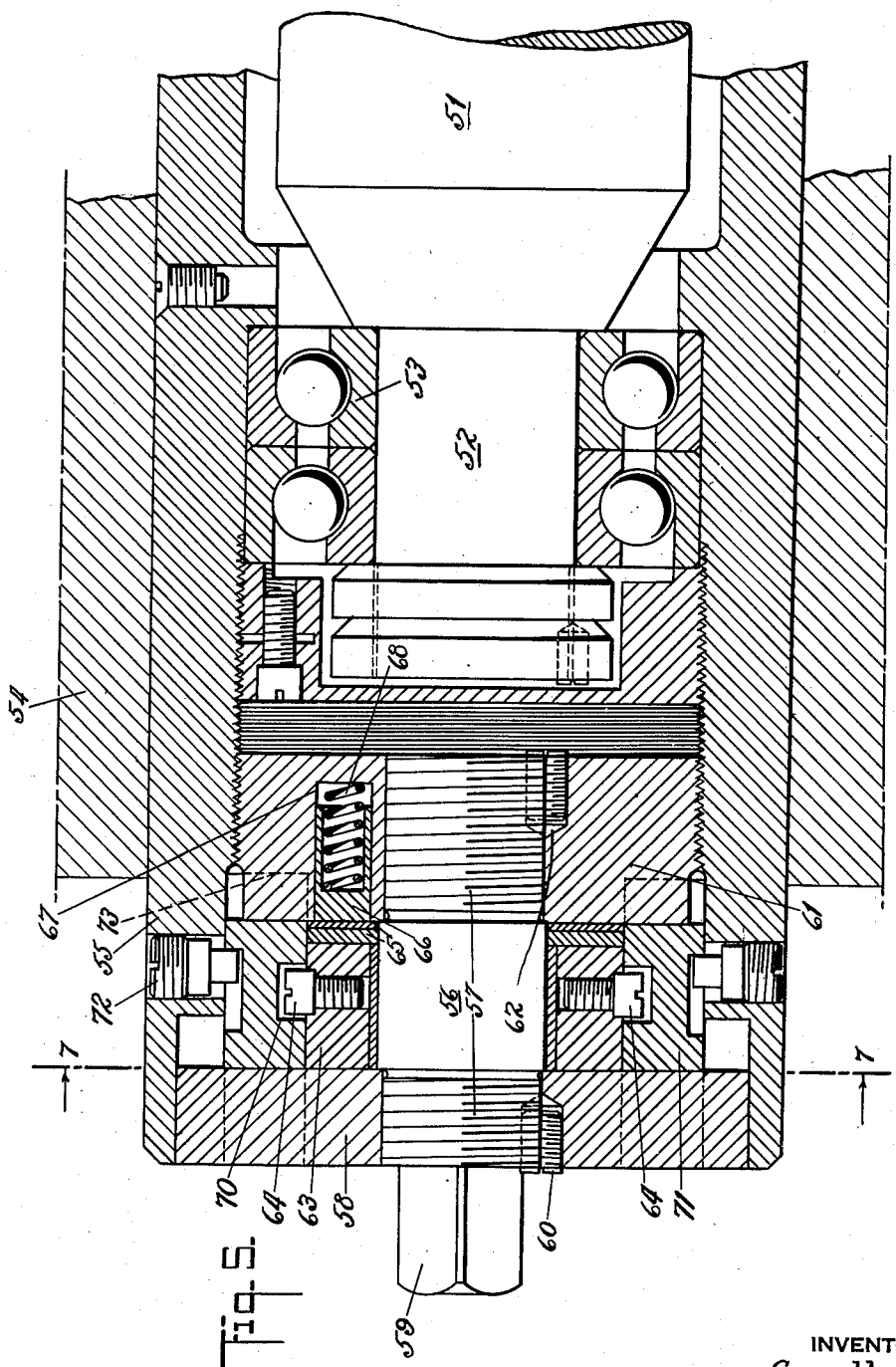

Aug. 4, 1953 C. E. ORR 2,647,775
MEANS FOR LOCKING REELS ON ARBORS
Filed Sept. 4, 1948 7 Sheets-Sheet 5
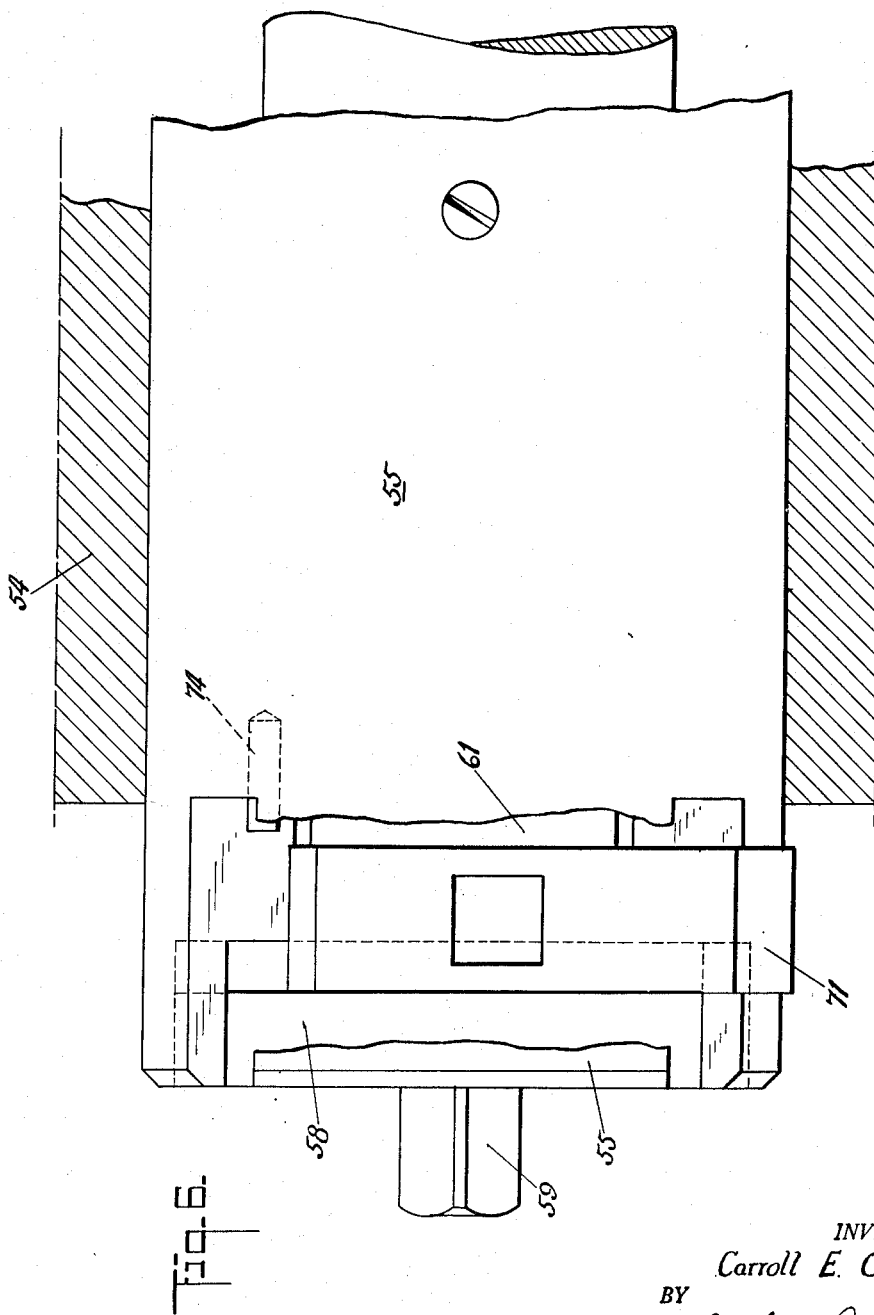
INVENTOR.
Carroll E. Orr
BY
Darby & Darby
Attorneys Aug. 4, 1953 — C. E. ORR — 2,647,775
MEANS FOR LOCKING REELS ON ARBORS
Filed Sept. 4, 1948 — 7 Sheets-Sheet 6
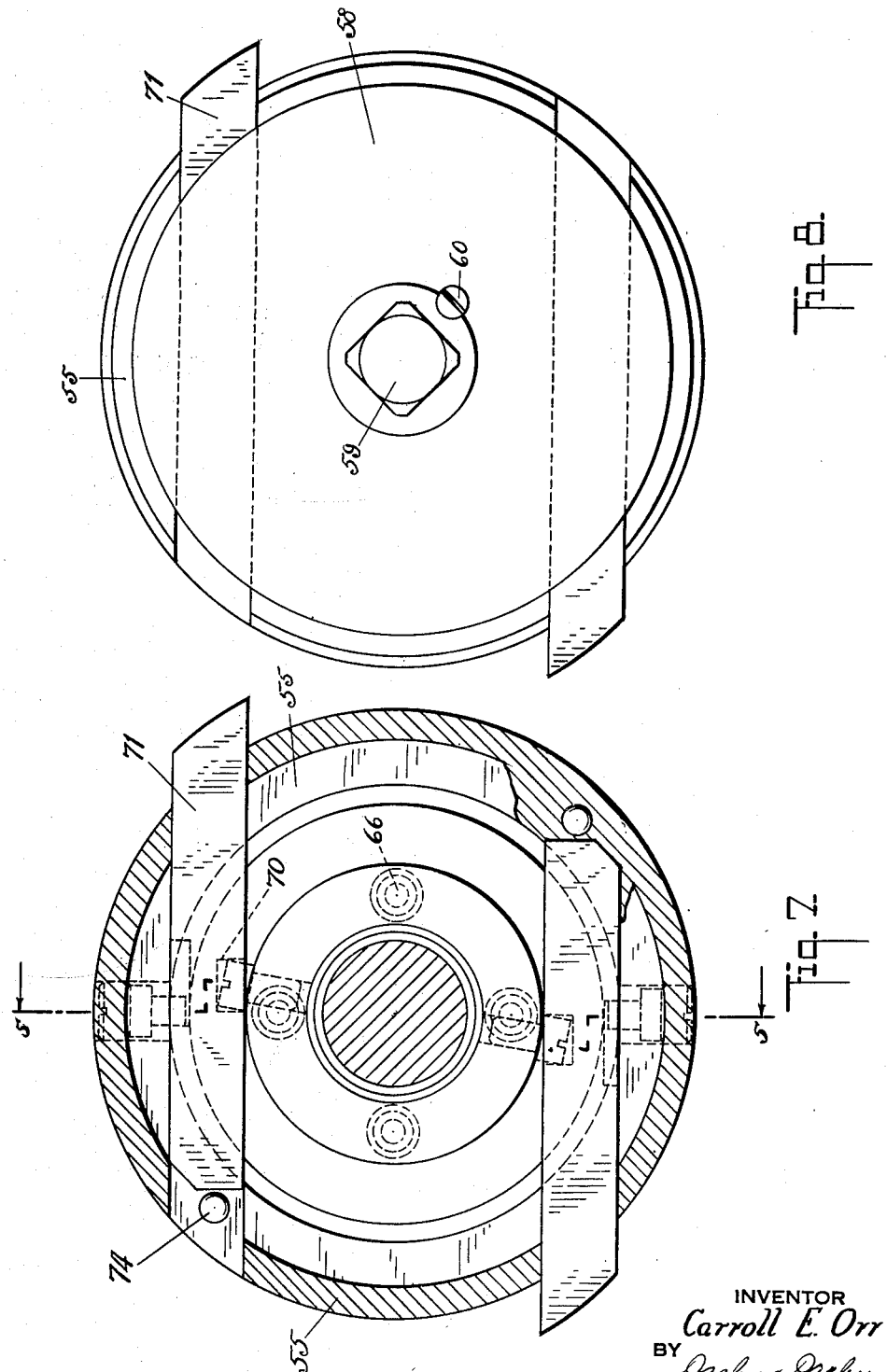
INVENTOR
Carroll E. Orr
BY Darby & Darby
ATTORNEYS

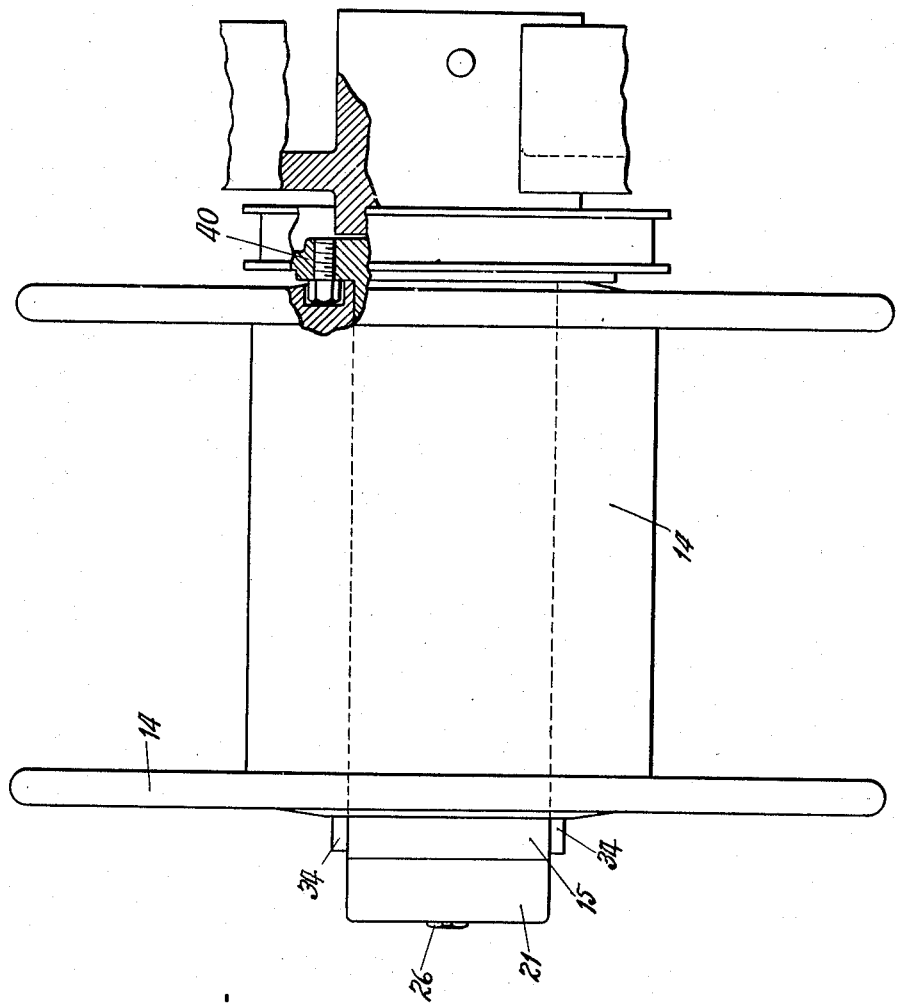

Patented Aug. 4, 1953

2,647,775

UNITED STATES PATENT OFFICE 2,647,775

MEANS FOR LOCKING REELS ON ARBORS

Carroll E. Orr, Westfield, N. J., assignor to Syncro Machine Company, Perth Amboy, N. J., a corporation of New Jersey Application September 4, 1948, Serial No. 47,901

4 Claims. (Cl. 287—53)

1

The present invention relates to a device for locking a reel on a shaft or arbor. More particularly still it relates to locking a reel of wire upon the arbor on or with which it is to rotate in such a manner as to prevent lateral movement of the reel along the arbor to prevent the reel from breaking loose and to prevent wear and noise. By the use of the device of my invention it is possible to lock a reel upon its arbor in one continuous movement without the necessity of adjusting a number of parts manually and sequentially.

It is an object of the invention to provide a means for locking a reel on an arbor which is rugged in construction and easily and conveniently operated.

It is another object of the invention to provide such a device which overcomes the tendency of the reel to move laterally of its shaft or arbor, this tendency being present especially in operations in which the arbor oscillates or reciprocates.

It is a further object of the invention to provide such a locking means which is operable with a high degree of safety and in which the locking and unlocking movements are effected by the continuous operation of an operating member.

Other objects and features of the invention will appear when the following description is considered in connection with the annexed drawings in which—

Figure 1 is a vertical cross-sectional view of the locking device of my invention taken on the plane of the line 1—1 of Figure 4. This figure shows the locking device as applied to a reel which is mounted upon an arbor;

Figure 2 is a horizontal cross-sectional view of the device of Figure 1 taken on the plane of the line 2—2 of Figure 3;

Figure 3 is a vertical cross-section of the device of my invention taken on the plane of the line 3—3 of Figure 1;

Figure 4 is an end elevation of the device of Figure 1;

Figure 5 is a vertical cross-sectional view of a second and preferred form of the locking device of my invention, this view being taken on the plane of the line 5—5 of Figure 7;

Figure 6 is a top plan view of the device of Figure 5, a portion of the outer casing being broken away to show the interior structure;

Figure 7 is a vertical cross-sectional view of the device of Figure 5, the section being taken on the plane of the line 7—7 of Figure 5;

Figure 8 is an end elevation of the modification and preferred form of my invention; and

2

Figure 9 is a side elevation illustrating the mode of utilizing either form of my invention to lock a reel upon an arbor.

Referring now to the drawings, there is shown at 10 an arbor which is mounted upon a shaft 11. At its lefthand end the arbor 10 is supported upon the shaft 11 by means of the ball bearings 13 which are mounted upon the reduced portion 12 of the shaft 11. At the other end, not shown, the arbor is mounted upon the shaft in any suitable manner and is provided with a plate in the usual manner, this plate serving to seat the reel as will appear. As shown in Figure 1, the reel 14 is in its operating position. Mounted upon the arbor 10 is a cylindrical arbor extension 15 which is provided with an annular portion 16 and is fastened to the arbor 10 by means of the screws 17. The arbor extension 15 is provided with a central threaded aperture 18 with which cooperates a threaded operating member 20 in a manner which will shortly appear.

Fastened to the arbor extension 15 is an arbor cap 21, this cap being provided with an annular rim 22 in order to definitely position it properly and being fastened to the arbor extension by means of the screws 23. Mounted within the opening between the portion 24 of the arbor cap 21 and the portion 25 of the arbor extension 15 are the working portions of the lock device.

These portions comprise screw 20 already mentioned which terminates at its lefthand end in a head 26 adapted to be rotated by means of a removable socket wrench 27. Also mounted on the screw 20 but free for rotation thereon are the lock carrier 28, friction washers 30, lock washer 29 and nut 31.

The lock carrier 28 is circular in form and is provided with two notches 32 in which are seated pins 33 which extend to the left as seen in Figure 1 from the lock bars 34. In order to accommodate the lock bars 34, the arbor extension 15 is provided with slotted openings 35, as indicated in Figure 3. It should be noted at this point that the reduced end 12 of the shaft 11 is provided at 36 with a shallow counterbore in order to provide space for the threaded operating member or screw 20.

Mounted in the portion 25 of the arbor extension 15 is a pin 37 which extends to the left as seen in Figure 2 and into a notch 38 in the lock carrier 28 (Figures 2 and 3). This pin thus serves to limit the rotary movement of the lock carrier.

A pin 40 is mounted in the portion 25 of the arbor extension 15 in alignment with a hole 41 in the lock carrier 28. As will hereinafter appear, this pin 40 serves to lock the carrier 28 against rotary movement.

In operation a reel such as 14 is placed on the arbor 10 and pushed back against the rear plate 40 (Fig. 9). Wrench 27 is then placed on the head 26 of the screw 20 and turned clockwise. Through the medium of the nut 31, lock washer 29, and the friction washers 30, this movement causes immediate clockwise movement of the lock carrier 28. The pins 33 then cause the bars 34 to extend beyond the periphery of the arbor extension 15, as is clearly shown in Figures 3 and 4. The amount of movement of the carrier, and consequently of the lock bars 34, is limited by the pin 37 since the lower edge of the notch 38 in the righthand surface (Figure 2) of lock carrier 28 will contact this pin. When the lock carrier 28 is in the position just described, the hole 41 in the rear surface of the lock carrier 28 will be in alignment with the pin 40. Continued clockwise rotation of the wrench or crank 27 advances the screw 20 and the parts carried thereby to the right as seen in Figures 1 and 2. As this motion occurs the pin 40 enters the hole 41 thus providing a positive lock preventing rotation of carrier 28 and thus also preventing withdrawal of the locking bars 34.

Further continued clockwise motion of the crank or wrench 27, screw 20 and associated parts brings the locking bars 34 against the outer end of the reel, i. e. into the position shown in Figure 9, and thus exerts a confining pressure sufficient to maintain the reel in a fixed position on the arbor. As will be seen, the pressure of the locking bars 34 against the reel end prevents any lateral motion and any possibility of "slap" when the reel and the associated arbor are subjected to reciprocating or other movements. The crank or wrench 27 is, of course, removed after the reel has been locked in position and when it is desired to remove a reel the wrench is again utilized and by means thereof the screw 20 rotated in a counterclockwise direction. By this means the lock carrier 28 and associated parts are moved to the left until the hole 41 is freed from the pin 40 at which time the lock carrier 28 rotates in a counterclockwise direction and the lock bars 34 are drawn inwardly and within the periphery of the arbor extension 15. At this time the reel is, of course, free and may be removed.

A second and preferred form of my invention is illustrated in Figures 5 through 8. Although this structure is generally similar to that of Figures 1 through 4, the details of the structure differ enough so that it is deemed preferable to utilize a different series of reference characters in the description thereof.

Referring now to Figure 5 a shaft 51 is provided with a reduced portion 52 on which is mounted a ball bearing 53. Supported upon the bearing 53 (and upon another bearing not shown) is an arbor 55 on which the reel 54 is adapted to be mounted. The locking mechanism comprises a lock carrier assembly generally designated 56. This assembly comprises a screw 57 on which a cover plate 58 is threaded, the cover plate being locked in position by means of the set screw 60 inserted in a threaded bore on the juncture of screw 57 and cover plate 58. The cover plate 58 fits into an enlarged opening in the arbor end as shown in Figure 5.

At its opposite or righthand end, the screw 57 has threaded thereupon a disc 61 which is locked in position by means of a set screw 62 in a manner similar to that in which the set screw 60 locks the cover plate 58. Rotatably mounted on the central unthreaded portion of the screw 57 is a locking bar operating disc 63 which at points spaced 180° apart about its circumference carries the locking bar operating screws or pins 64.

The disc 63 has bearing against it at its righthand end the friction washers 65, these washers cooperating with friction plugs 66 which are located in bores 67 in the disc 61. The plugs 66 are urged to the left, as seen in Figure 5, by means of springs 68. As shown in Figure 7 there are four of these spring pressed plugs or plungers 66 provided although a greater or lesser number might readily be used.

The locking bar operating screws 64 described above extend into bores 70 (see Figures 5 and 7) in the inner surfaces of locking bars 71. Locking bars 71 extend outwardly, as is seen in Figures 7 and 8 and upon rotation of the lock carrier 56 are caused to extend beyond the arbor 55 and assume the position shown particularly in Figures 7 and 8. The bars are limited in their outward movement by screws 72 which are threaded into the arbor 55 and which extend into generally rectangular cutouts in the outer surfaces of the locking bars 71.

The arbor 55 is, of course, provided with rectangular openings at each end of the locking bars so that they may be extended through the walls of the arbor 55. Additionally, these rectangular openings are elongated in the longitudinal direction, as is indicated by the dotted line 73 (Figure 5) in order that the bars may move into position against the forward end of a reel such as that indicated at 54.

The disc 61 carries an external thread which meshes with an internal thread cut on the interior wall of arbor 55 and in order to rotate the lock carrier structure 56, the screw 57 is provided at its outer or lefthand end with a head 59 adapted to receive a wrench such as, for example, a socket wrench.

In order to prevent the retraction of the locking bars 71 after they have been extended into the position of Figures 7 and 8, pins 74 are pressed into the walls of the slots in the arbor 55 in which slots the locking bars lie when they are in their retracted position. These pins extend from the ends of the slot towards the left, as seen in Figure 6. Due to this arrangement of pins 74, the locking bars are prevented from moving towards their retracted position during inward (righthand) movement of the lock carrier 56, as will shortly be described.

In operation, a reel is slipped over the arbor 55 and a wrench placed upon the head 59 of screw 57 and turned in a clockwise direction. The disc 61 likewise turns in a clockwise direction and due to the pressure exerted by the friction plugs 66 on the friction washers 65, the disc 63 likewise turns in a clockwise direction. This movement of disc 63 causes the locking bars 71 to move into the positions shown particularly in Figure 7, that is to their extended positions in which the ends of the bars lie in front of the face flange of a reel on the arbor 55. Continued turning of the lock carrier 56 causes inward movement of the entire lock carrier structure due to the threaded connection between the disc 61 and the interior of the arbor 55.

The entire lock carrier structure thus moves to the right as seen in Figure 5 until the locking bars 71 bear against the face flange of the reel. Screws 72 serve to limit the outward movement of the locking bars 71 and serve also to limit the longitudinal movement of the lock carrier structure 56. It will be noted that upon further movement (righthand in Figure 5) of the lock carrier structure subsequent to the full extension of the locking bars 71 the inner ends of the locking bars 71 pass behind pins 74 and, therefore, cannot be retracted.

Due to this arrangement of the pins 74 when the motion of the lock carrier is reversed, i. e. when the wrench on the head 59 of screw 57 is rotated in a counterclockwise direction, the lock carrier structure moves to the left before the locking bars are retracted. If pins 74 were not provided the retraction would occur prior to the movement of the carrier structure to the left which is undesirable.

The device of Figures 5 through 8 does not differ materially in appearance from that of Figures 1 through 4 and therefore Figure 9 may be said to represent both devices.

While I have described preferred embodiments of my invention, it will be understood that other modifications of the structure could readily be made and I wish, therefore, to be limited not by the foregoing description but solely by the claims granted me.

What is claimed is:

1. In a device for locking a reel in position on a shaft, in combination, an internally threaded hollow end on said shaft, a driving disc threaded into said shaft end, a lock operating disc mounted for rotation coaxially with said driving disc, friction means for rotating said lock operating disc under drive of said driving disc, a plurality of locking bars extending across chords of said shaft, said bars being mounted for reciprocation in a plane normal to the shaft axis, and means on said operating disc for moving said locking bars into position with one end of each extending beyond the outer periphery of said shaft.

2. In a device for locking a reel in position on a shaft, in combination, an internally threaded hollow end on said shaft, a driving disc threaded into said shaft end, a lock operating disc mounted for rotation coaxially with said driving disc, spring pressed plungers in said driving disc, friction washers between the face of said driving disc and the face of said lock operating disc, said plungers and washers forming a friction drive for said lock operating disc, a plurality of locking bars extending across chords of said shaft, said bars being mounted for reciprocation along said chords and in a plane normal to the shaft axis, and means on said second mentioned disc for moving said locking bars into position with one end of each extending beyond the outer periphery of said shaft.

3. In a device for locking a reel in position on a shaft, in combination, an internally threaded hollow end on said shaft, a driving disc threaded into said shaft end, a lock operating disc mounted for rotation coaxially with said driving disc, friction means for rotating said lock operating disc under drive of said driving disc, a plurality of locking bars extending across chords of said shaft, said bars being mounted for reciprocation along said chords and in a plane normal to the shaft axis, means on said lock operating disc for moving said locking bars into position with one end of each extending beyond the outer periphery of said shaft, and means for limiting the axial movement of the assembly comprising said discs and locking bars.

4. In a device for locking a reel in position on a shaft, in combination, an internally threaded hollow end on said shaft, said shaft having slots therein, a driving disc threaded into said shaft end, said disc having a stem thereon, a lock operating disc mounted for rotation on said stem, a plurality of locking bars extending across chords of said shaft and into said slots in said hollow shaft end, said bars being mounted for reciprocation along said chords and in a plane normal to the shaft axis, said bars having bores therein, pins extending from the periphery of said lock operating disc into said bores in said locking bars to cause extension of said bars beyond the periphery of said hollow shaft end upon rotation of said lock operating disc, and means fixed to said driving disc for moving said lock operating disc and said locking bars with said driving disc during axial movement thereof.

CARROLL E. ORR.

References Cited in the file of this patent

UNITED STATES PATENTS

| Number | Name | Date |
|---|---|---|
| 1,946,455 | Davis | Feb. 6, 1934 |
| 2,266,408 | Bruestle | Dec. 16, 1941 |